March 12, 1968

L. D. KEEGAN 3,372,767

FRICTION MEANS FOR CONNECTING DRIVE
AND SECONDARY WHEELS OF VEHICLES

Filed May 31, 1966

INVENTOR.
LARRY D. KEEGAN
BY Eugene M. Eckelman
ATTORNEY

March 12, 1968

L. D. KEEGAN 3,372,767

FRICTION MEANS FOR CONNECTING DRIVE
AND SECONDARY WHEELS OF VEHICLES

Filed May 31, 1966

INVENTOR.
LARRY D. KEEGAN
BY Eugene M. Eckelman
ATTORNEY

March 12, 1968
L. D. KEEGAN
3,372,767
FRICTION MEANS FOR CONNECTING DRIVE
AND SECONDARY WHEELS OF VEHICLES
Filed May 31, 1966
3 Sheets-Sheet 3
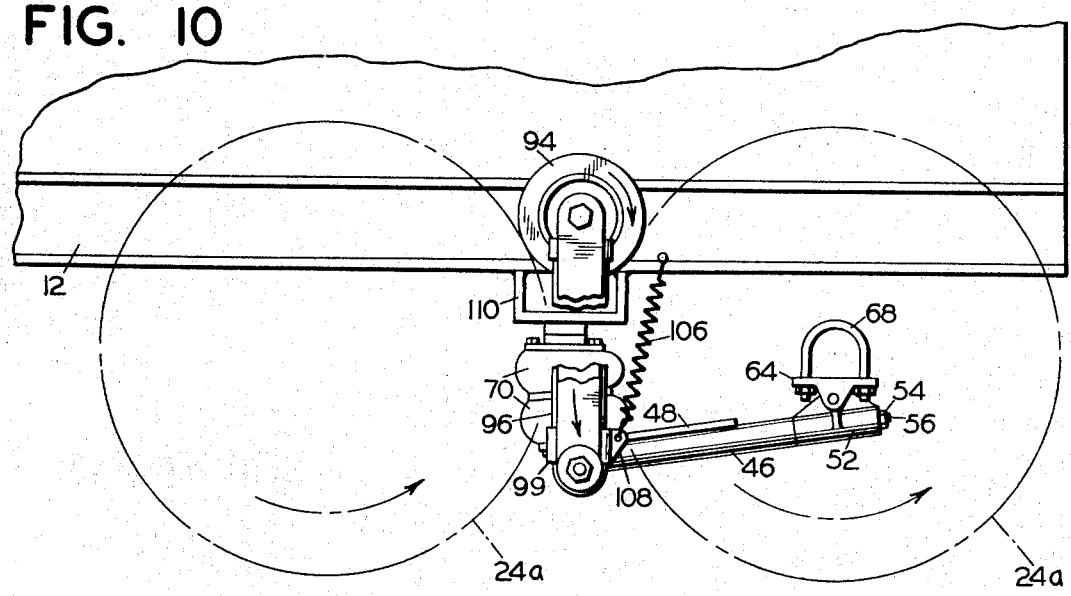
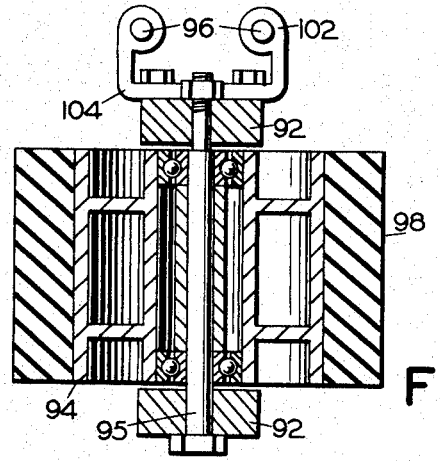
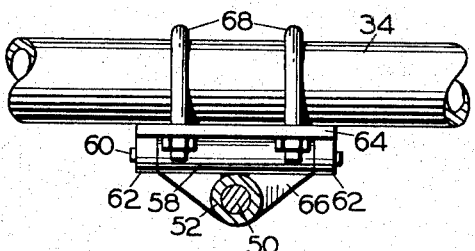
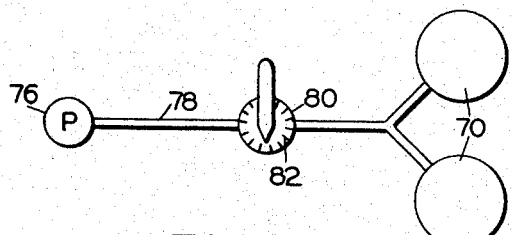
INVENTOR.
LARRY D. KEEGAN
BY Eugene M. Eckelman
ATTORNEY United States Patent Office 3,372,767
Patented Mar. 12, 1968

3,372,767
FRICTION MEANS FOR CONNECTING DRIVE
AND SECONDARY WHEELS OF VEHICLES
Larry D. Keegan, Rte. 2, Box 66,
Clackamas, Oreg. 97015
Filed May 31, 1966, Ser. No. 554,000
8 Claims. (Cl. 180—22)

ABSTRACT OF THE DISCLOSURE

The invention includes friction wheels adapted to be engaged between a pair of vehicle wheels for transferring driving power from one of the wheels in the pair to the other. To accomplish such purpose, a supporting arm supports one friction wheel in edge alignment with a pair of the vehicle wheels and also supports air bags which when inflated bear against the vehicle frame and force the support arm down to engage the friction wheels with the vehicle wheels.

---

This invention relates to a friction means for connecting drive and secondary wheels of vehicles.

Many hauling vehicles such as trucks have tandem axle arrangements including a driven axle and an undriven or dead axle. In one type of truck construction, there are rear tandem axles forming an integral part of the truck and in another type of construction there is one driven axle which is integral with the truck and also there is connecting structure, such as a fifth wheel, for detachably securing a dolly or a trailer thereto having an undriven axle which forms with the driven axle of the vehicle a tandem axle assembly. In the types of vehicles mentioned, the drive wheels alone may not have the desired traction when the truck is on a wet or otherwise slippery surface, and it is a primary objective of the present invention to provide new and useful improvements in means for connecting the drive wheels of a truck with secondary or undriven wheels whereby to increase the traction on the road surface.

Another object is to provide friction connecting means of the type described having a structural arrangement wherein such means is operable in a novel manner for establishing a connection between drive and secondary wheels.

Another object is to provide friction connecting means of the type described having a friction wheel arranged for movement into and out of engagement with drive and secondary wheels of a vehicle and to include power expansion means bearing against the frame of the vehicle and forcibly moving the friction connecting means into engagement with the drive and secondary wheels.

Another object is to provide friction connecting means of the type described having a friction wheel on each side of the vehicle connected to a common axle which is capable of swivelling movement to accomplish individual and positive engagement of such pair of friction wheels with respective sets of side wheels of the vehicle.

Still another object is to provide friction connecting means for establishing a drive connection between drive and secondary wheels which is readily attached to existing vehicles without altering the latter.

Yet another object is to provide friction connecting means for establishing a drive connection between drive and secondary wheels which is fluid operated and serves to urge friction wheels in a downward direction by an upper bearing force on the frame of the vehicle, the fluid operated means having a control therefor in the operator's compartment and employing gauge means whereby the operator can apply a selective engaging pressure of the friction means with the wheels.

Additional objects and advantages will become apparent from the following description taken in connection with the accompanying drawings which illustrate a preferred form of the device.

In the drawings:

FIGURE 8 is a sectional view taken on the line 8—8 of FIGURE 5;

FIGURE 9 is an enlarged sectional view taken on the line 9—9 of FIGURE 2;

FIGURE 10 is a side elevational view of the present invention as applied to a different type of vehicle wheel assembly; and FIGURE 11 is a diagrammatic plan view of control means for the present device.

Figure 1:
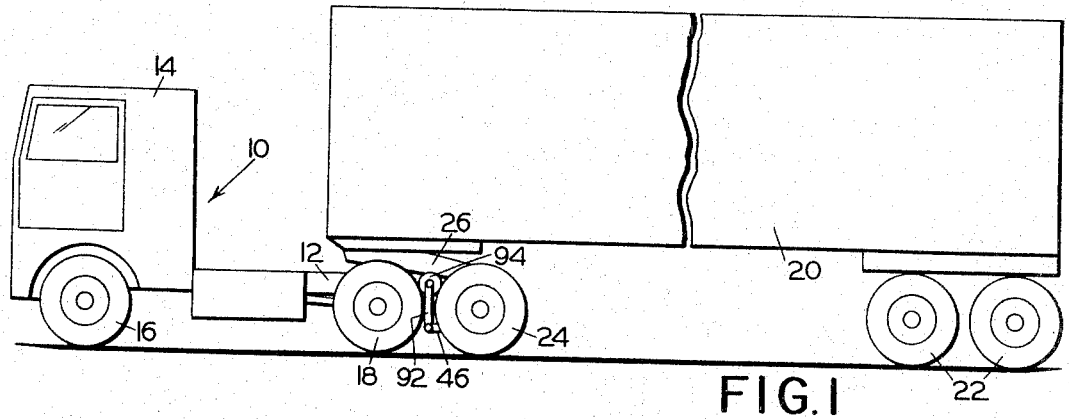
FIGURE 1 is a side elevational view of one form of vehicle with which the present invention may be associated.

Referring first to FIGURE 1, there is shown a vehicle 10 having a frame 12 on which is mounted an operator's compartment 14, front wheels 16, and rear wheels 18. This truck is adapted for pulling a trailer 20 supported at its rearward end by tandem wheels 22 and at its forward end by wheels 24.

Figure 2:
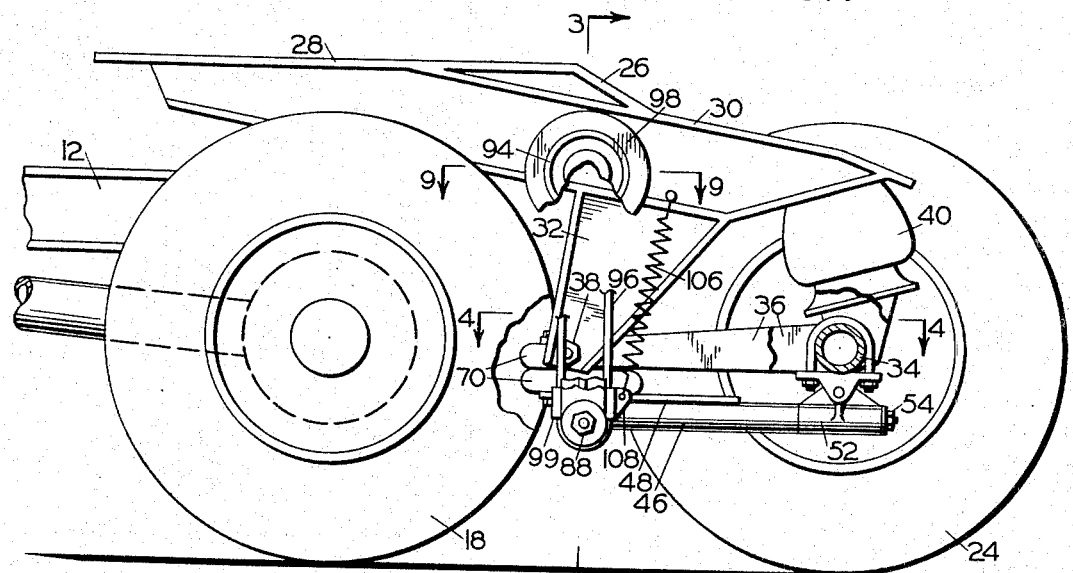
FIGURE 2 is a side elevational view, enlarged relative to FIGURE 1, showing the rear wheel assembly of FIGURE 1 illustrating the present friction means connected thereto, a portion of the wheel assembly being broken away.

In some instances, the wheels 24 will have integral connection with the trailer 20 or as shown in FIGURES 1 and 2 such wheels may comprise a part of a dolly or third axle structure 26 having conventional means, not shown, adapted for removable connection to the truck and including a top connecting plate or fifth wheel 28 to which the forward end of the trailer is removably connected.

Dolly 26 is of conventional structure, having a longitudinal frame portion 30 and a depending frame portion 32. Wheels 24 are mounted on an axle 34, and one or more draw bars 36, integrated at one end with the axle 34, extend forwardly and have pivotal connection at 38 to the depending frame portion 32. Interconnected between the axle and the rearward end of the frame portion 30 is one or more inflatable air bags 40 which provide suspension means for the dolly. In the usual construction, wheels 18 and 24 comprise dual wheels.

Figure 4:
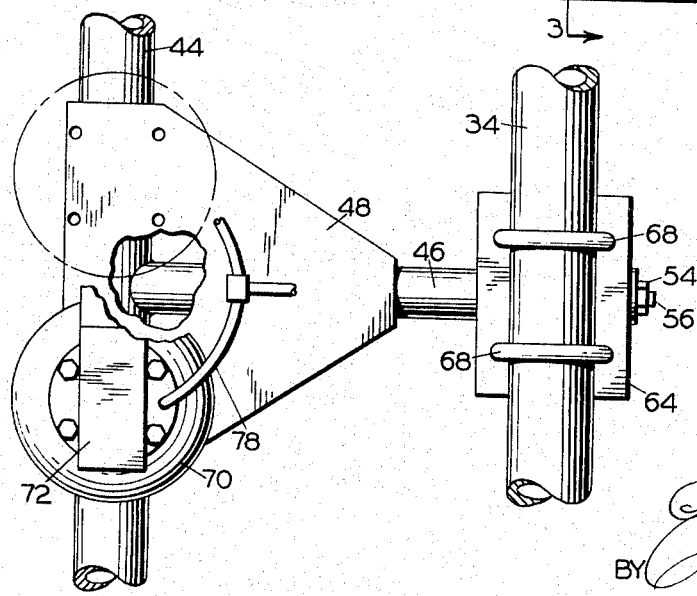
FIGURE 4 is an enlarged, fragmentary sectional view taken on the line 4—4 of FIGURE 2.
Figure 3:
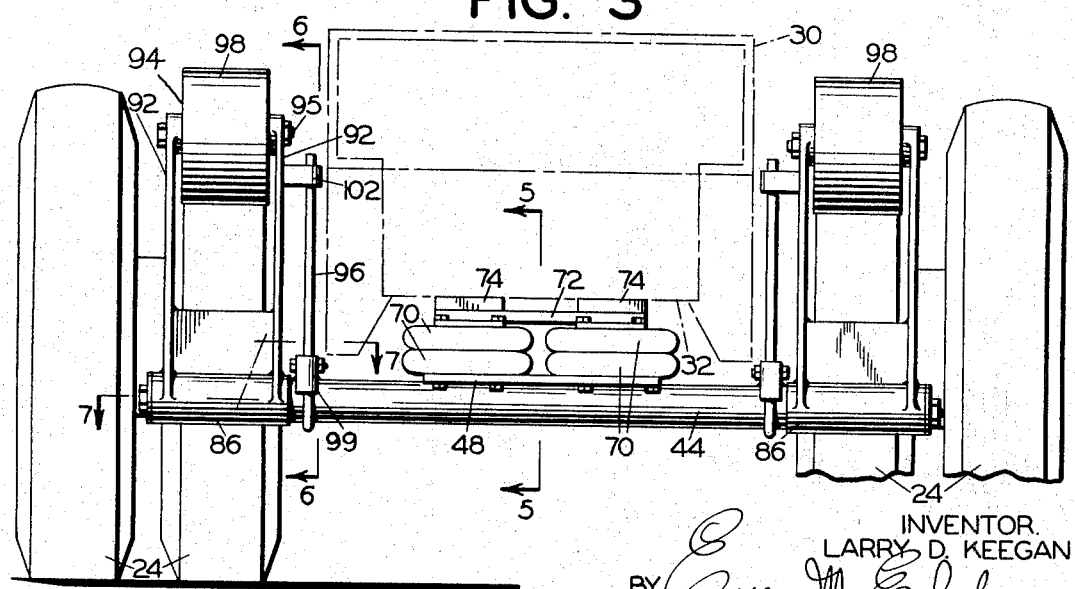
FIGURE 3 is a sectional view taken on the line 3—3 of FIGURE 2.

The present invention is intended for providing a connection between drive wheels 18 and secondary wheels 24, it being understood that wheels 18 are driven by the vehicle power plant and the wheels 24 normally run free on a dead axle. The invention comprises a transversely disposed axle 44, FIGURES 3, 4 and 5, to which is secured integrally, as by welding, a central arm or tongue 46, also seen in FIGURE 2. A gusset plate 48 is secured on the top of axle 44 and arm 46 for reinforcement.

Figure 5:
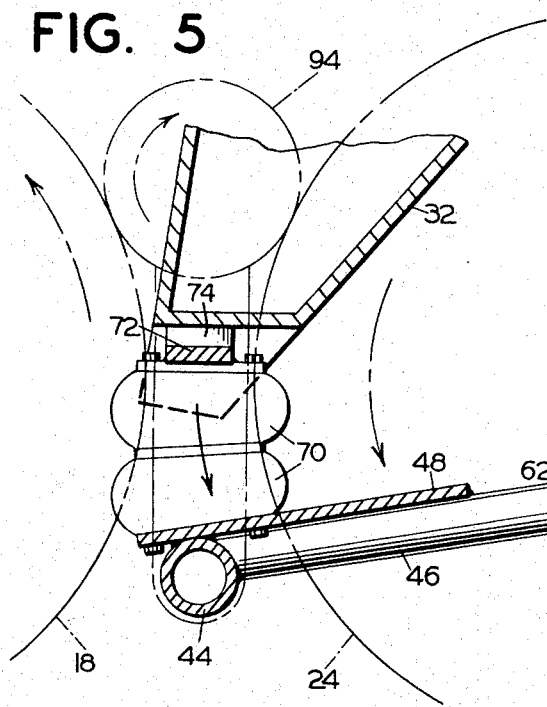
FIGURE 5 is an enlarged, fragmentary sectional view taken on the line 5—5 of FIGURE 3.
Figure 6:
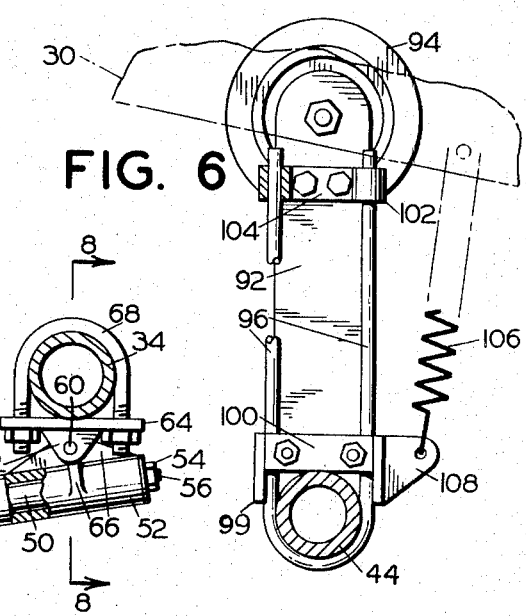
FIGURE 6 is an enlarged sectional view taken on the line 6—6 of FIGURE 3.

The rearward end of arm 46 terminates in a spindle 50, best seen in FIGURES 5 and 8, on which is pivotally mounted a connecting sleeve 52. Sleeve 52 is held on the spindle by an en dnut 54 threadedly mounted on a projecting stud 56 comprising an integral part of the spindle. Integral with the sleeve 52 and disposed crosswise on the upperside thereof is a socket 58, FIGURE 8, which receives a pivot pin 60 engageable in a pair of downwardly depending ears 62 on a bracket plate 64, for providing a pivotal movement of the arm 46 relative to said bracket plate. Reinforcement is provided between the sleeve 52 and socket 58 by webs 66. Bracket plate 64 is arranged to be connected to the rear axle 34 of the dolly by U-clamps 68. In the structure thus far described, it is apparent that the rearward end of the arm 46 is detachably secured to a secondary or dead axle 34 but that by means of such connection it is capable of vertical pivotal movement on the cross pin 60 and also can swivel in the sleeve 52.

Secured on the gusset plate 48 are one or more inflatable air bags 70, FIGURES 2–5. When two of such bags are utilized it is preferred that they be secured together by a top connecting plate 72. Secured on the top of connecting plate 72 are resilient bumper blocks 74, FIGURES 3 and 5, adapted for free abutment against the underside of depending frame portion 32. As the air bags 70 are inflated, they forcefully pivot the arm 46 downwardly.

With reference to FIGURE 11, which comprises a simplified diagram of the fluid system comprising a conventional pump 76 and connecting conduits 78, it is preferred that inflatable control of the bags 70 be accomplished by valve means 80 in the system located in the operator's compartment. By such arrangement, the operator can apply the desired pressure to the bags 70, for a purpose to be described in greater detail hereinafter. It is also desirable that the valve 80 be associated with gauge means 82 whereby the operator can apply a selective pressure to the system.

Figure 7:
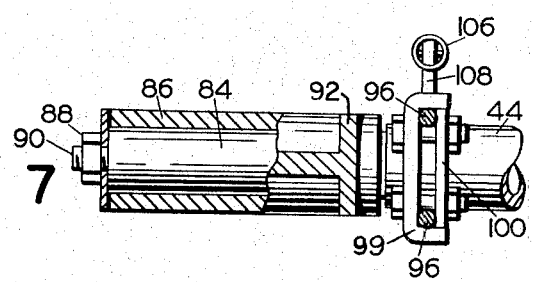
FIGURE 7 is an enlarged, fragmentary off-set sectional view taken on the line 7—7 of FIGURE 3.

The ends of axle 44 terminate in spindles 84, FIGURE 7, on which are pivotally mounted sleeves 86. These sleeves are held on the spindles by end nuts 88 mounted on studs 90 integrally projecting from the ends of the spindles. Secured to the sleeves 86 are pairs of upright bracket arms 92 which support at their upper ends freely rolling friction wheels 94, also seen in FIGURE 9, mounted on cross shafts 95 supported by the arms. Wheels 94 have a tire or friction surface 98, and such friction wheels are of a diameter greater than the normal spacing between drive wheels 18 and secondary wheels 24 whereby upon moving such wheels to a position between the wheels 18 and 24 a drive connection is provided between the latter wheels.

Secured on the axle 44 inwardly of each of the spindles 86 is a pair of upstanding guide fingers 96, FIGURES 2, 3, 6 and 7. As best seen in FIGURES 2 and 7 each set of the guide fingers 96 may be formed from a single piece of material such as rod material bent into a U-shape and passing around the axle 34. Each pair of the fingers pass upwardly through a U-shaped bracket 99 which is secured to the axle such as by welding, and which provides stationary mounting of the fingers on the axle. Securement of the fingers 96 to the brackets 99 is accomplished by clamp plates 100 bolted to the bracket 99. Fingers 96 are slidably engaged by apertured ears 102, FIGURES 3, 6 and 9, on upwardly disposed brackets 104 bolted or otherwise secured to one of the bracket arms 92 on each side. Fingers 96, being secured in a stationary position on the axle 44, serve to hold the friction wheel assembly in an upright position, and since the said fingers are slidably engaged by the brackets 104 they permit relative vertical movement of the friction wheels and the axle 44. Even though the fingers 96 are sufficiently rigid to maintain the wheel assemblies in their upright position, it is desirable that such fingers have some flexibility or springiness to permit the wheel assemblies to pivot a slight amount on the spindles 84 of the axle, thus allowing the wheels 94 to individually adjust themselves to a position of uniform engagement with their respective sets of wheels.

The friction wheel assembly is urged to an upper, inoperative position by one or more tension springs 106 interconnected between the frame 30 and lugs 108 on the brackets 98.

In the normal or inoperative condition of the friction connecting means, the air bags 70 are deflated and the springs 106 hold the friction wheels 94 upwardly and out of engagement with the wheels 18 and 24. By the application of pressure to the bags 70, the axle 44 is forced downwardly which pulls the friction wheels 94 into surface engagement with the two wheels 18 and 24. With the application of a sufficient downward force on the wheels 94 a drive connection established between the vehicle wheels. Since the pressure imparted to the bags 70 can be varied by selective setting of valve 80 the extent of the drive connection between the wheels 18 and 24 can be controlled by the operator, the amount of downward force exerted on the wheels 94 determining the extent of drive to be applied from the drive wheels 18 to the secondary wheels 24.

Since the arm 46 has a pivotal connection with the vehicle axle 34 for up and down movement and also has rotatable connection on a swivel, it is apparent that the friction wheel assembly can adjust itself to apply an equal application of pressure on the two sets of vehicle wheels. Furthermore, since the guide fingers 96 are somewhat flexible, wheels 94 can individually adjust forwardly and rearwardly so as to uniformly engage their respective pairs of vehicle wheels. Although the arm 46 can swivel in the sleeve 52 to provide lateral rocking adjustment of the axle 34, such arm is rigidly connected as far as sidewise sway is concerned.

FIGURE 10 illustrates application of the present invention to a vehicle structure having a permanently attached tandem axle arrangement having sets of dual wheels 24a. In this structure, the frame 12 has a cross frame member 110 against which the air bags 70 bear for forcing the friction wheel assembly downwardly to an operative position. The structure of the friction wheel assembly is identical to the structure described in connection with FIGURE 1.

The parts of the instant invention are arranged so as not to interfere with existing vehicle suspension structure, and thus the invention is easily attached to existing vehicles. The friction wheels are arranged for engaging the inwardly disposed wheel of dual wheels, and thus chains can be applied to the outer duals. Although the present friction connecting means can be secured to either the live or dead axle, it is preferred to attach it to the dead axle whereby in the vehicle structure of FIGURE 1, such connecting means is not carried by the truck when the dolly 26 is not in use. The resilient application of power to the friction wheels by means of the inflatable air bags 70 as well as the individual adjusting features of the friction wheels, resulting from the swivel connection at the point of axle attachment and the ability of the friction wheels to individually adjust forwardly and rearwardly, causes a smooth support by the vehicle wheels and eliminates substantially any axle bounce.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A mechanism for connecting a pair of spaced, edge aligned forward and rearward wheels together on a vehicle having a frame, said mechanism comprising: a longitudinally extending supporting arm having a pivot connection at one of its ends arranged to be connected to the vehicle, a laterally extending axle secured to said supporting arm adjacent the end of the latter opposite from the pivot connection thereof, a friction wheel rotatably supported at each end of said axle for engaging wheels on each side of the vehicle, said friction wheels being arranged to be located in edge alignment with the vehicle wheels and arranged for simultaneous frictional surface rolling engagement with the respective edge aligned vehicle wheels for transferring a driving connection from one wheel to the other upon selective pivotal movement of said supporting arm, said pivot connection for said supporting arm including a swivel providing lateral tilting of said axle for individual vertical adjustment of each of said friction wheels into engagement with respective pairs of vehicle wheels, and means for forcibly pivoting said supporting arm in a direction to cause engagement of said friction wheels with the respective vehicle wheels.

2. The mechanism of claim 1 including upright bracket arms pivotally attached to opposite ends of said axle and rotatably supporting said friction wheels on said axle, and upright holding means engaged with said bracket arms for holding the latter in an upright position, said upright holding means being sufficiently flexible to permit a slight forward and rearward movement of said friction wheels for uniformly engaging the surface of the vehicle forward and rearward wheels.

3. The mechanism of claim 1 wherein said means for forcibly pivoting said supporting arm comprises inflatable expandable members supported on said supporting arm and arranged to bear against the vehicle frame for forcibly pivoting said supporting arm.

4. A vehicle construction comprising a frame, supporting wheel assemblies on said frame including tandem axles for pairs of spaced, edge aligned forward and rearward wheels, an operator's compartment on said frame, a longitudinally extending supporting arm having a pivot connection at one of its ends connected to one of said axles, a laterally extending axle member secured to said supporting arm adjacent the end of the latter opposite from the pivot connection thereof, a friction wheel rotatably supported at each end of said axle member for engaging wheels on each side of the vehicle, said friction wheels being arranged to be located in edge alignment with the vehicle wheels and arranged for simultaneous frictional, surface rolling engagement with the respective edge aligned vehicle wheels for transferring a driving connection from one wheel to the other upon selected pivotal movement of said supporting arm, said pivot connection for said supporting arm including a swivel providing lateral tilting of said axle for individual vertical adjustment of each of said friction wheels into engagement with respective pairs of vehicle wheels, and means for forcibly pivoting said supporting arm in a direction to cause engagement of said friction wheels with the respective vehicle wheels.

5. The vehicle construction of claim 4 wherein said wheel assemblies include forward wheels supported on an axle secured to said vehicle frame and rearward wheels supported on an axle forming a part of a frame detachably connected to said vehicle frame, the pivot connection for said supporting arm being connected to the axle of said detachable frame.

6. The vehicle construction of claim 4 wherein said wheel assemblies include forward wheels supported on an axle secured to said vehicle frame and rearward wheels supported on an axle forming a part of a frame detachably connected to said vehicle frame, said forward and rearward wheels comprising dual wheels having inner and outer duals, said friction wheel being arranged to engage the inner duals only for the transferring of said driving connection from one wheel to another, said pivot connection for said supporting arm being connected to the axle of said detachable frame.

7. A mechanism for connecting a pair of spaced, edge aligned forward and rearward wheels together on a vehicle having a frame, said mechanism comprising: a supporting arm having a pivot connection at one of its ends arranged to be connected to the vehicle, an axle secured to said supporting arm adjacent the end of the latter opposite from the pivot connection thereof, upright bracket arms pivotally attached to opposite ends of said axle, a pair of friction wheels, means rotatably supporting one of said friction wheels on each of said bracket arms whereby a friction wheel is disposed on each end of said axle for engaging wheels on each side of the vehicle, said friction wheels being arranged to be located in edge alignment with the vehicle wheels and arranged for simultaneous frictional, surface rolling engagement with the respective edge aligned vehicle wheels for transferring a driving connection from one wheel to the other upon selected pivotal movement of said supporting arm, upright fingers on said axle engaged with said bracket arms for holding the latter in an upright position, said fingers being sufficiently flexible to permit a slight forward and rearward movement of said friction wheels for uniformly engaging the surface of the vehicle forward and rearward wheels, and power operated expansion means supported on said supporting arm and arranged to bear against the vehicle frame for forcibly pivoting said supporting arm in a direction to cause engagement of said friction wheel with the vehicle wheels.

8. A mechanism for connecting a pair of spaced, edge aligned forward and rearward wheels together on a vehicle having a frame, said mechanism comprising: a supporting arm having a pivot connection at one of its ends arranged to be connected to the vehicle, an axle secured to said supporting arm adjacent the end of the latter opposite from the pivot connection thereof, upright bracket arms pivotally attached to opposite ends of said axle, a pair of friction wheels, means rotatably supporting one of said friction wheels on each of said bracket arms whereby a friction wheel is disposed on each end of said axle for engaging wheels on each side of the vehicle, said friction wheels being arranged to be located in edge alignment with the vehicle wheels and arranged for simultaneous frictional, surface rolling engagement with the respective edge aligned vehicle wheels for transferring a driving connection from one wheel to the other upon selective pivotal movement of said supporting arm, said pivot connection for said supporting arm including a longitudinally disposed swivel providing lateral tilting of said axle for individual vertical adjustment of each of said friction wheels into engagement with respective pairs of vehicle wheels, and power operated expansion means supported on said supporting arm and arranged to bear against the vehicle frame for forcibly pivoting said supporting arm in a direction to cause engagement of said friction wheel with the vehicle wheels.

References Cited

UNITED STATES PATENTS 1,897,944   2/1933   Carter _____ 180—22

FOREIGN PATENTS 1,150,495   8/1957   France.

A. HARRY LEVY, *Primary Examiner.*